(12) United States Patent
Hoefle et al.

(10) Patent No.: US 8,973,619 B2
(45) Date of Patent: Mar. 10, 2015

(54) CLIMATE TUBE, PARTICULARLY FOR AIRPLANES

(75) Inventors: Roland Hoefle, Friedrichshafen (DE); Markus Roy, Wain (DE); Hubert Stuetzle, Laupheim (DE); Michael Straubing, Allmendingen (DE)

(73) Assignee: Airbus Operations GmbH, Hamburg (DE)

( * ) Notice: Subject to any disclaimer, the term of this patent is extended or adjusted under 35 U.S.C. 154(b) by 1167 days.

(21) Appl. No.: 12/933,993

(22) PCT Filed: Mar. 31, 2009

(86) PCT No.: PCT/EP2009/002334
§ 371 (c)(1),
(2), (4) Date: Nov. 23, 2010

(87) PCT Pub. No.: WO2009/121557
PCT Pub. Date: Oct. 8, 2009

(65) Prior Publication Data
US 2011/0056580 A1 Mar. 10, 2011

Related U.S. Application Data

(60) Provisional application No. 61/040,751, filed on Mar. 31, 2008.

(30) Foreign Application Priority Data

Mar. 31, 2008 (DE) .......................... 10 2008 016 462

(51) Int. Cl.
*F16L 9/14* (2006.01)
*F16L 9/18* (2006.01)
(Continued)

(52) U.S. Cl.
CPC ............... *F24F 13/0254* (2013.01); *F16L 9/14* (2013.01); *F16L 9/19* (2013.01); *F24F 13/0263* (2013.01);
(Continued)

(58) Field of Classification Search
CPC B29C 65/5071; B29C 65/5085; B29C 53/40; B29C 65/5057; B29C 66/1142; B29C 66/438; F24F 13/0263; F16L 59/147
USPC ......... 138/111–113, 115–117, 152, 156–171; 428/36.3–36.5, 36.8, 36.9, 73; 285/124.4
See application file for complete search history.

(56) References Cited

U.S. PATENT DOCUMENTS 1,618,455 A * 2/1927 Lindsay ......................... 138/147
1,907,307 A * 5/1933 Smith ............................ 138/149
(Continued)

FOREIGN PATENT DOCUMENTS

CA 123883 1/1988
DE 1981057 3/1968
(Continued)

OTHER PUBLICATIONS

International Search Report, Forms PCT/ISA/220, PCT/ISA/210, PCT/ISA/237, European Patent Office, Jun. 30, 2009.
(Continued)

*Primary Examiner* — Patrick F Brinson
*Assistant Examiner* — Matthew Lembo
(74) *Attorney, Agent, or Firm* — Wood, Herron & Evans, LLP

(57) ABSTRACT

A climate tube, in particular for aircraft, includes an inner layer and an outer layer of fiber composite plastic material. To achieve a high stiffness combined with a low weight and to achieve good thermal insulation properties, disposed between the inner layer and the outer layer is an at least almost completely circumferential honeycomb core, which is firmly connected to the inner layer the outer layer. The radial extent of the honeycomb core is large compared to the radial extent of the inner layer and the outer layer, and the mutually opposed longitudinal ends of the honeycomb core abut one another and are surrounded by a ply of fiber composite plastic material.

16 Claims, 4 Drawing Sheets

(51) Int. Cl.
- *F16L 9/00* (2006.01)
- *F24F 13/02* (2006.01)
- *F16L 9/19* (2006.01)
- *B29C 53/40* (2006.01)
- *B29C 65/50* (2006.01)
- *B29C 65/00* (2006.01)
- *B29K 105/06* (2006.01)
- *B29L 23/00* (2006.01)
- *B29L 31/18* (2006.01)
- *B29L 31/60* (2006.01)

(52) U.S. Cl.
CPC ............ *B29C 53/40* (2013.01); *B29C 65/5042* (2013.01); *B29C 65/5057* (2013.01); *B29C 65/5085* (2013.01); *B29C 66/1142* (2013.01); *B29C 66/438* (2013.01); *B29C 66/439* (2013.01); *B29K 2105/06* (2013.01); *B29L 2023/22* (2013.01); *B29L 2031/18* (2013.01); *B29L 2031/608* (2013.01); *B29C 65/5071* (2013.01); *B29C 66/4322* (2013.01); *B29C 66/72525* (2013.01)
USPC ............ 138/151; 138/115; 138/149; 138/156

(56) References Cited

U.S. PATENT DOCUMENTS

| | | | | |
|---|---|---|---|---|
| 2,224,346 A | * | 12/1940 | Hobrock | 138/152 |
| 3,187,778 A | * | 6/1965 | Peyton et al. | 138/143 |
| 3,526,086 A | * | 9/1970 | Morgan | 138/111 |
| 3,617,699 A | * | 11/1971 | Othmer | 392/469 |
| 3,782,452 A | * | 1/1974 | Ceplon | 165/135 |
| 4,025,675 A | * | 5/1977 | Jonda | 428/36.2 |
| 4,036,617 A | | 7/1977 | Leonard et al. | |
| 4,064,355 A | * | 12/1977 | Neroni et al. | 174/47 |
| 4,120,347 A | | 10/1978 | Molnar | |
| 4,647,326 A | | 3/1987 | Pott | |
| 4,748,060 A | * | 5/1988 | Fry et al. | 428/36.9 |
| 6,227,252 B1 | * | 5/2001 | Logan | 138/172 |
| 6,457,237 B1 | * | 10/2002 | Matthews et al. | 29/890.144 |
| 6,823,899 B2 | * | 11/2004 | Weibel et al. | 138/149 |
| 6,949,282 B2 | * | 9/2005 | Obeshaw | 428/131 |

FOREIGN PATENT DOCUMENTS

| | | |
|---|---|---|
| DE | 3246755 | 3/1984 |
| DE | 20001437 | 5/2000 |
| DE | 10012832 | 9/2001 |
| DE | 102005023148 | 11/2006 |
| DE | 102005061838 | 7/2007 |
| EP | 0403685 | 12/1990 |
| EP | 0607602 | 7/1994 |
| EP | 1364772 | 11/2003 |
| EP | 1878562 | 1/2008 |
| GB | 1480928 | 7/1977 |
| JP | 05237961 | 9/1993 |

OTHER PUBLICATIONS

German Office Action of parallel German patent application with English language summary, Feb. 12, 2009.

* cited by examiner

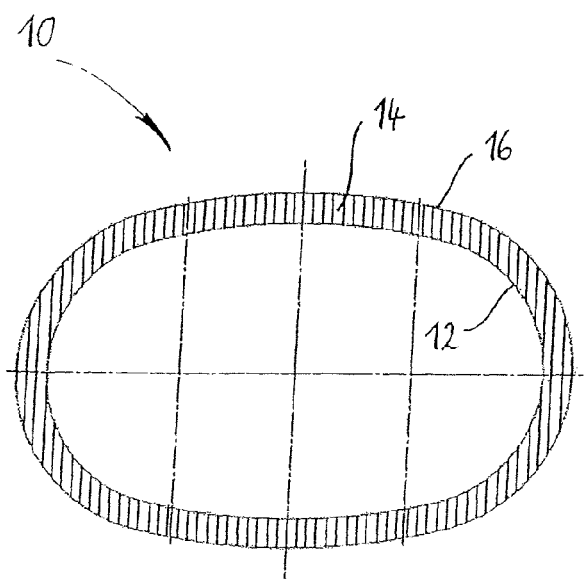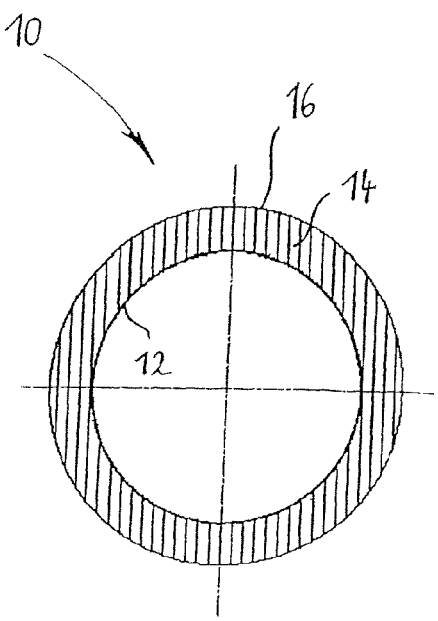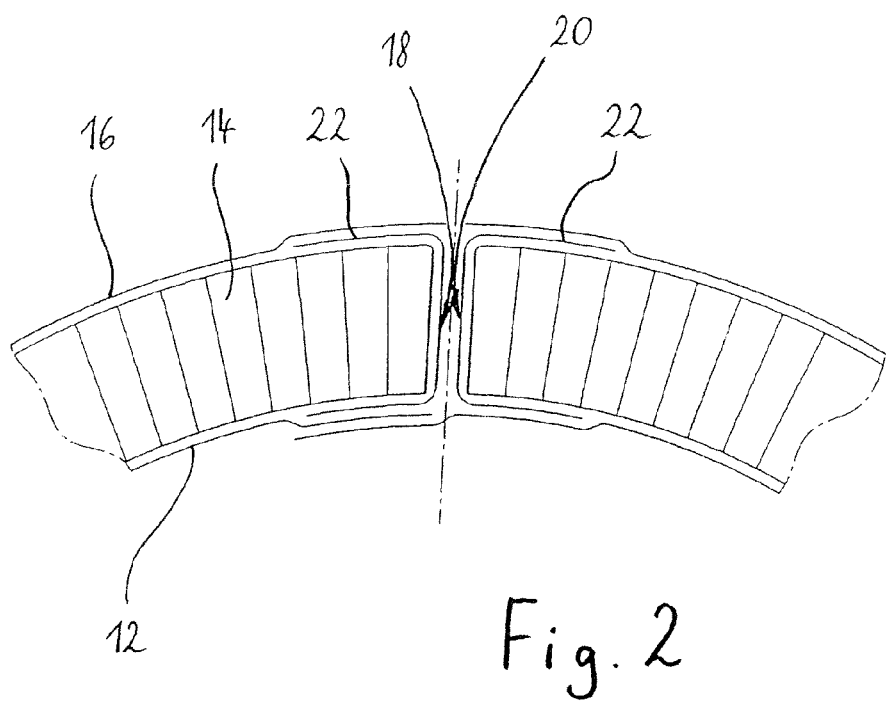

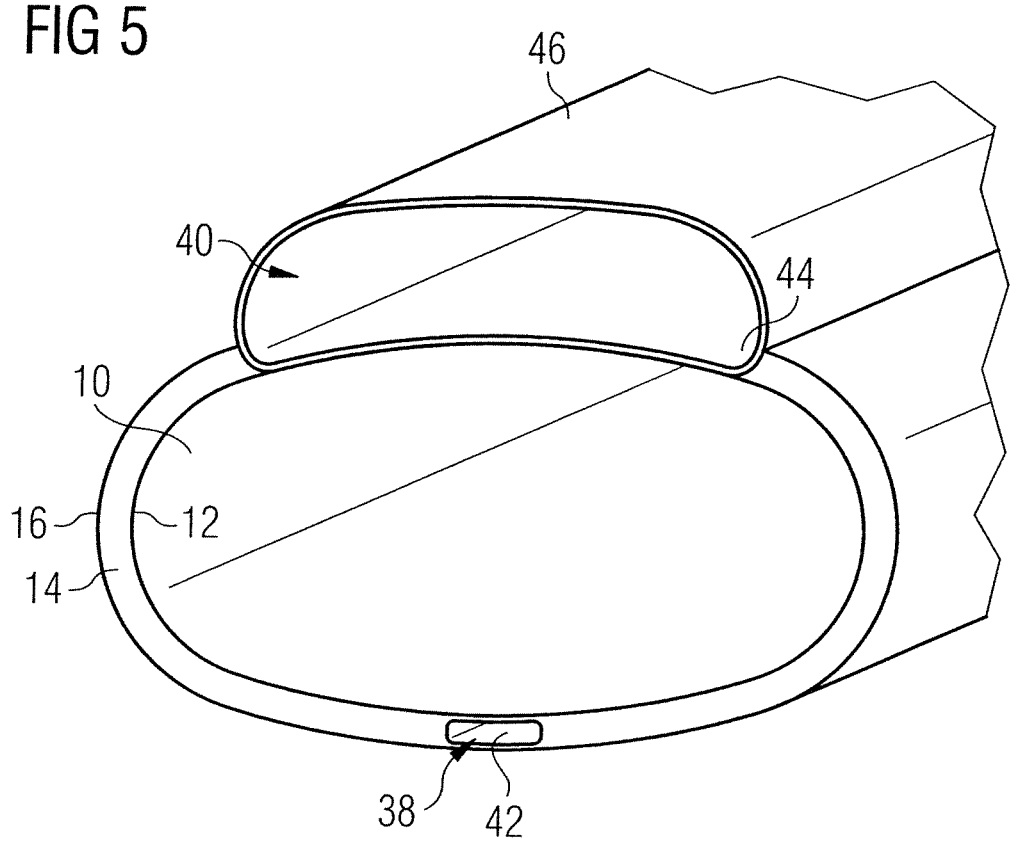
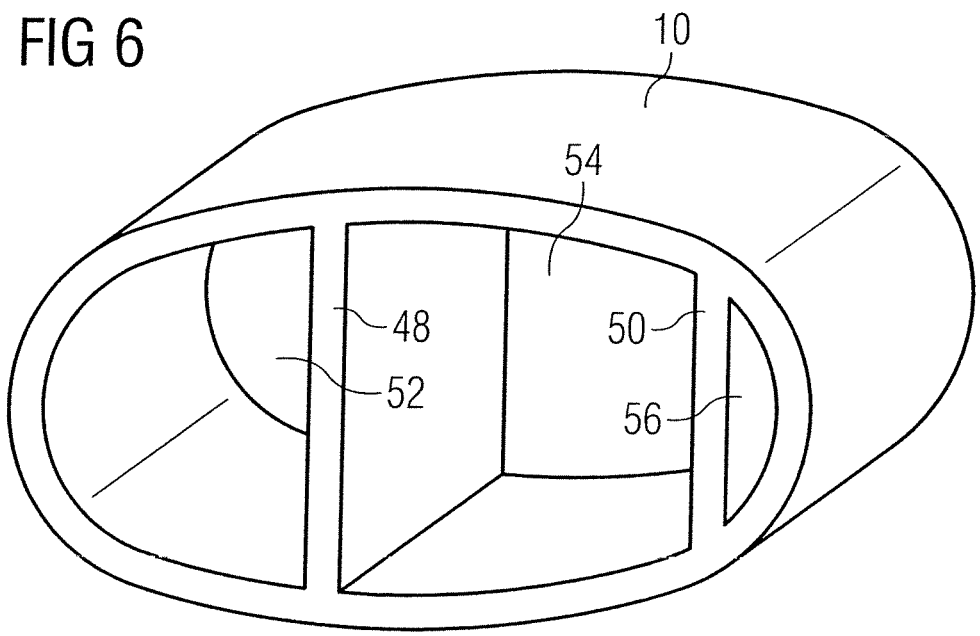

CLIMATE TUBE, PARTICULARLY FOR AIRPLANES

This application claims priority to International Application No. PCT/EP20089/002334 filed on Mar. 31, 2009, under Section 371 and/or as a continuation under Section 120, which in turn claims priority to U.S. Provisional Patent Application No. 61/040,751 and to German Patent Application No. 10 2008 016 462.3, both filed on Mar. 31, 2008.

TECHNICAL FIELD

The invention relates to a climate tube, in particular for aircraft, having an inner layer and an outer layer of fiber composite plastic material.

BACKGROUND

Climate tubes of this type are well-known for example in aircraft construction and form a part of the air-conditioning system of an aircraft. Climate tubes are used for example to carry heated air from a processing unit, a so-called air-conditioning pack, into the cabin of an aircraft. It has hitherto been customary to manufacture climate tubes from a plurality of thin plies of a fiber composite plastic material, so-called prepregs. The number of material plies used was geared to the stability requirements to be demanded of a given climate tube.

Climate tubes for supplying fresh air have to be insulated to prevent undesirable condensation on the pipe surfaces in the aircraft. For this reason, flexible foam of a suitable thickness is conventionally fitted onto the outside of climate tubes of prior art.

In order to fasten conventional climate tubes for example in an aircraft, the pipes are fixed by means of pipe clamps to supports that are connected to the aircraft structure. If the climate tube is externally insulated with foam, the pipe fastening has to comprise a spacer profile to minimize heat conduction between the aircraft structure and the pipe body, i.e. to guarantee a thermally isolated fastening of the pipe to the aircraft structure.

The underlying object of the invention is to provide an improved climate tube that is suitable in particular for use in aircraft.

SUMMARY OF THE INVENTION

This object is achieved according to the invention by a climate tube having the features described below. In the case of the climate tube according to the invention, disposed between the inner and the outer layer of fiber composite plastic material is an at least almost completely circumferential honeycomb core, which is connected to the inner and the outer layer and the radial extent of which is large compared to the radial extent of the inner and outer layer. By this it is meant that the radial extent of the honeycomb core is several times as great as the thickness of the inner or outer layer. Preferably the radial dimension of the honeycomb core is at least five times as great as the thickness of the inner layer or the outer layer, however the radial dimension of the honeycomb core may easily be even eight times, ten times or fifteen times greater than the thickness of one of the two covering layers. The thickness (radial dimension) of the honeycomb core of a climate tube according to the invention results, on the one hand, from stability requirements and, on the other hand, from the required insulation of the climate tube. If the thickness of the honeycomb core is selected so as to correspond at least approximately to the thickness of the foam material layer previously required for insulation purposes, then an equivalent insulating effect results. Applying a foam material layer onto the climate tube is therefore no longer necessary.

The inner layer and the outer layer, which may also be referred to as covering layers, may be glass fiber- and/or carbon fiber-reinforced composite laminates impregnated with synthetic resin. Such a composite laminate is frequently referred to as a prepreg. The honeycomb core may comprise for example paper honeycombs impregnated with synthetic resin.

A climate tube according to the invention has several advantages over conventional climate tubes: because of the honeycomb core it is markedly stiffer and therefore deforms much less in the event of compression loading (internal or external pressure). The increased stability achieved by the sandwich structure (inner layer, honeycomb core, outer layer) moreover enables a climate tube according to the invention itself to be used as a support for further systems, for example a further climate tube may be fastened to a climate tube according to the invention and need not, as is customary, be separately connected to the aircraft structure. In climate tubes that are subject to low pressure, the number of material plies of fiber composite plastic material may be markedly reduced because the honeycomb core leads to an overall stiffness that, even without many plies of fiber composite plastic material, is equal to or better than that of conventional climate tubes. As the honeycomb core moreover has a lower mass per unit area, low-pressure climate tubes according to the invention are also lighter than was previously customary. Finally, as already mentioned, it is possible to dispense with the foam material previously required for insulation purposes, because the honeycomb core, given a suitable design (i.e. a suitable thickness), has an equivalent insulating effect.

To facilitate bending of the honeycomb core into the pipe shape, in preferred embodiments of the climate tube according to the invention the honeycomb core is pre-stretched and/or expanded in a direction transversely of the longitudinal extent of the individual honeycombs. The cross section of the individual honeycombs of the honeycomb core is consequently deformed in an oblong manner and may therefore adapt better to the curvature needed to achieve the pipe shape. During bending of the honeycomb core into the pipe shape there occurs, above an imaginary center plane of the honeycomb core, an elongation of the pre-stretched side walls and, below the imaginary center plane, a compression of the pre-stretched side walls of each honeycomb.

The inner and outer layer of fiber composite plastic material are each formed by at least one material ply. Should it be desirable for the sake of stability, the inner layer and/or the outer layer may each comprise a plurality of material plies.

The forming of the honeycomb core into the pipe shape results in two longitudinally extending abutting edges. These abutting edges are preferably surrounded by a ply of fiber composite plastic material in order to protect the structure of the honeycomb core and enable a good connection of the two abutting edges. To increase the overall strength of the climate tube, in preferred developments thereof it is contemplated that in the region of the previously mentioned, longitudinally extending abutting edges at least two material plies of the inner layer overlap.

In a preferred development of a climate tube according to the invention, on the exterior thereof an additional pipe is fastened directly, i.e. without a support. In particular, the direct fastening of the additional pipe may be effected by means of an adhesive join. The additional pipe may be used for example to carry a branched-off air stream to sensor equipment in order to measure the temperature or the moisture content of the air stream or the like. The additional pipe may also be used to accommodate electric control lines. In a particularly preferred development, the additional pipe is disposed partially embedded in the exterior of the climate tube, i.e. it is partially countersunk in the exterior of the climate tube. The extent of the embedding in the exterior in this case does not lead to a reduction of the thickness of the honeycomb core of the climate tube, rather there is merely a displacement into the opening cross section of the climate tube, so that the extent of the embedding in the exterior correspondingly reduces the opening cross section at the interior of the climate tube. The wall thickness of the climate tube in the region of the external embedding therefore remains identical to the wall thickness of the climate tube in regions without external embedding. Besides the space saved and the reduction of components achieved by this solution, a precise positioning of the additional pipe is also guaranteed without special mounting devices such as supports or the like being used.

The cross section of a climate tube according to the invention is preferably circular, oval or elliptical, but may also assume other cross-sectional shapes. With the climate tube according to the invention it is also possible to make the cross section vary over its length. For example, the cross section of a climate tube according to the invention may be initially circular, then oval or elliptical and finally, if desired, become circular again. By suitable stretching and elongation of the honeycomb core, such variations in the cross section may be realized without sacrificing the stability of the climate tube.

Preferred embodiments of climate tubes according to the invention are developed to support a further climate tube. According to an embodiment, this is achieved by means of an insert, which is fastened in the honeycomb core of the climate tube and which at its side projecting from the climate tube is adapted to support a further climate tube, for example by means of a pipe clamp. According to another embodiment, a support, for example a clamp-type support, is fastened on the climate tube and may support a further climate tube.

Climate tubes according to the invention however also allow the integral construction of an additional duct or a plurality of additional ducts. If the additional duct need have only a small cross section, such an additional duct may be formed by a recess of the honeycomb core that extends in longitudinal direction of the climate tube. In other words, the additional duct then extends inside the wall of a climate tube according to the invention. Such an additional duct may be used to receive a flowing fluid, but may also be used equally well to accommodate electric or other lines.

If the additional duct is to have a larger cross section, then, in addition to the recess of the honeycomb core that extends in longitudinal direction of the climate tube, the outer layer of fiber composite plastic material may also be recessed. In the recess thus achieved, which extends in longitudinal direction of the climate tube, a partial-pipe-shaped insert part having the desired free cross section may then be fastened, for example by glueing. Depending on the required purpose, the wall of the partial-pipe-shaped insert part may be constructed in an identical manner to the climate tube itself, i.e. with a honeycomb core. Alternatively, the wall of the partial-pipe-shaped insert part may however merely comprise one or more plies of fiber composite plastic material. The opening cross section of the partial-pipe-shaped insert part may differ in shape from that of the climate tube and be in particular of a flatter design. Despite the partially recessed honeycomb core, such a climate tube having one or more additional ducts has a high stability.

Finally, a climate tube according to the invention, independently of whether or not it has an additional duct as described above, may be subdivided in longitudinal direction by means of at least one dividing wall. This allows for example intake air and discharged air to be carried separately from one another in a single climate tube. The dividing wall and/or the dividing walls, which may take the form of sandwich webs, are easily capable of withstanding pressure differences between individual fluid streams and providing thermal insulation between the individual fluid streams. If thermal insulation is not required, the dividing wall or the dividing walls may also be made of simple fiber composite plastic material.

The manufacture of climate tubes according to the invention is effected in principle in exactly the same way as the manufacture of sandwich panels with a honeycomb core that are frequently used in aircraft construction. More precisely, the inner layer, the honeycomb core and the outer layer are placed successively into a mould, the mould is then closed and subsequently heated in order to bake the inner layer, the honeycomb core and the outer layer to one another. After cooling, the finished climate tube forming a structural unit may be removed from the mould.

BRIEF DESCRIPTION OF THE DRAWINGS

Preferred embodiments of climate tubes according to the invention are described in detail below with reference to diagrammatic figures. These show:

FIG. 1A a cross section through a first embodiment of a climate tube according to the invention having an oval cross section;

FIG. 1B a representation similar to FIG. 1A of a second embodiment having a circular-cylindrical cross section, FIG. 2 an enlarged view of the connecting region of two longitudinally extending abutting edges of a climate tube according to the invention, FIG. 3 a climate tube similar to FIG. 1A with a support for a further climate tube, FIG. 4A a perspective view of a climate tube similar to FIG. 1A with an additional pipe fastened directly to the exterior of the climate tube, FIG. 4B in cross section a sub-region of the embodiment shown in FIG. 4A, FIG. 5 a three-dimensional view of a climate tube having a large and a small additional duct, and FIG. 6 a three-dimensional view of a climate tube similar to FIG. 1A, the interior of which is subdivided into three chambers by means of two dividing walls extending in longitudinal direction.

DETAILED DESCRIPTION

Figure 3:
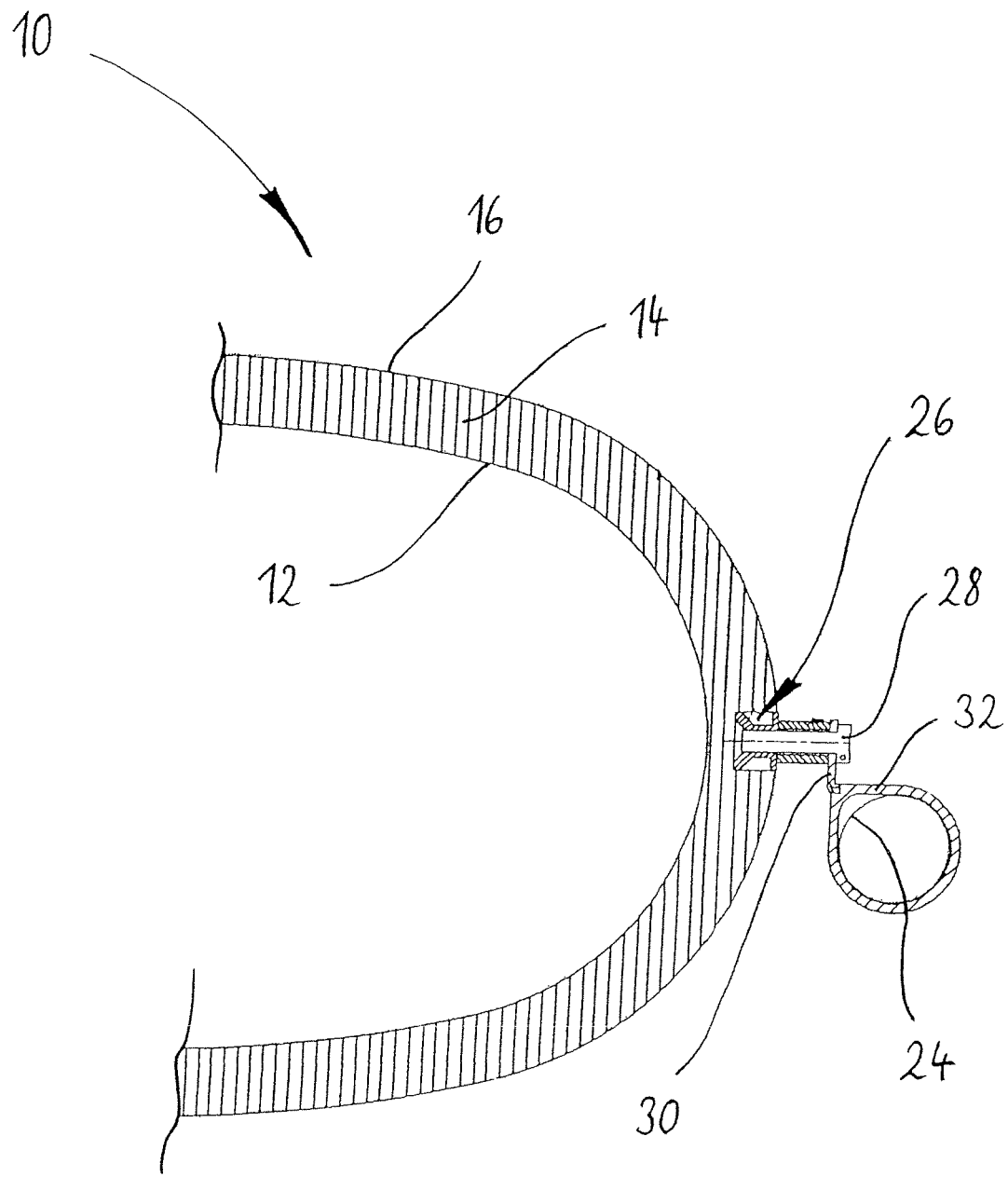

FIGS. 1A and 1B show in cross section two embodiments of a climate tube 10 that is suitable in particular for use in aircraft as part of the aircraft air-conditioning system. The climate tube 10, which has according to FIG. 1A an oval-cylindrical cross section and according to FIG. 1B a circular-cylindrical cross section, comprises an inner layer 12, a honeycomb core 14 and an outer layer 16. As FIGS. 1A and 1B reveal, the radial extent of the honeycomb core 14 is large compared to the thickness (in radial direction) of the inner layer 12 and the outer layer 16.

Both the inner layer 12 and the outer layer 16, which are also referred to as covering layers of the climate tube 10, are made from a panel-shaped fiber-reinforced composite laminate impregnated with synthetic resin, mostly referred to as a prepreg. Each layer 12, 16 comprises at least one material ply of the said composite laminate, but may also comprise a plurality of material plies.

The honeycomb core 14 comprises a honeycomb structure likewise impregnated with synthetic resin, for example paper honeycombs impregnated with synthetic resin. Such honeycomb cores are known to experts in the field from sandwich panels that are often used in aircraft construction, in particular for the interior fittings of an aircraft cabin.

The inner layer 12, the honeycomb core 14 and the outer layer 16 in a finished climate tube 10 are firmly connected to one another, for example by being baked together in a mould (not represented). The climate tube 10 therefore has a homogeneous, continuous sandwich structure, which results in a high stiffness.

From FIG. 2 the structure of a typical embodiment of a climate tube 10 emerges more precisely. The honeycomb core 14, the individual honeycombs of which are radially aligned, is covered internally by a, here, single-ply layer 12 of fiber composite plastic material and externally by a, here, likewise single-ply layer 16 of fiber composite plastic material. The initially flat honeycomb core 14 is bent into the desired pipe shape, thereby forming two mutually opposed, longitudinally extending abutting edges 18, 20. To enable a stable connection of these abutting edges 18, 20, the honeycomb core 14 in the region of its abutting edges 18, 20 is surrounded by a ply 22 of fiber composite plastic material. The inner layer 12 and the outer layer 16 in this case each extend over the ply 22.

As FIG. 2 reveals, in the region of the abutting edges 18, 20 a plurality of material plies of the inner layer 12 moreover overlap in order to produce a trouble-free connection in the region of the abutting edges 18, 20.

FIG. 3 shows in section a part of a climate tube 10 similar to the one shown in FIG. 1A, wherein for supporting a further climate tube 24 an insert 26 is fastened, for example by means of an adhesive join, in the honeycomb core 14 of the climate tube 10. By means of a screw 28 screwed into the insert 26 a fixing lug 30 of a clamp-shaped pipe support 32 is fastened to the insert 26 and hence to the climate tube 10. The further climate tube 24 extends through the pipe support 32 and is in this way supported thereby.

Because of its high proportion of free space formed by the individual honeycombs of the honeycomb core 14, the honeycomb core 14 has very good temperature-insulating properties. A conventionally required foam material layer, which was applied for insulation purposes onto the exterior of climate tubes, is therefore no longer required.

Figure 4A:
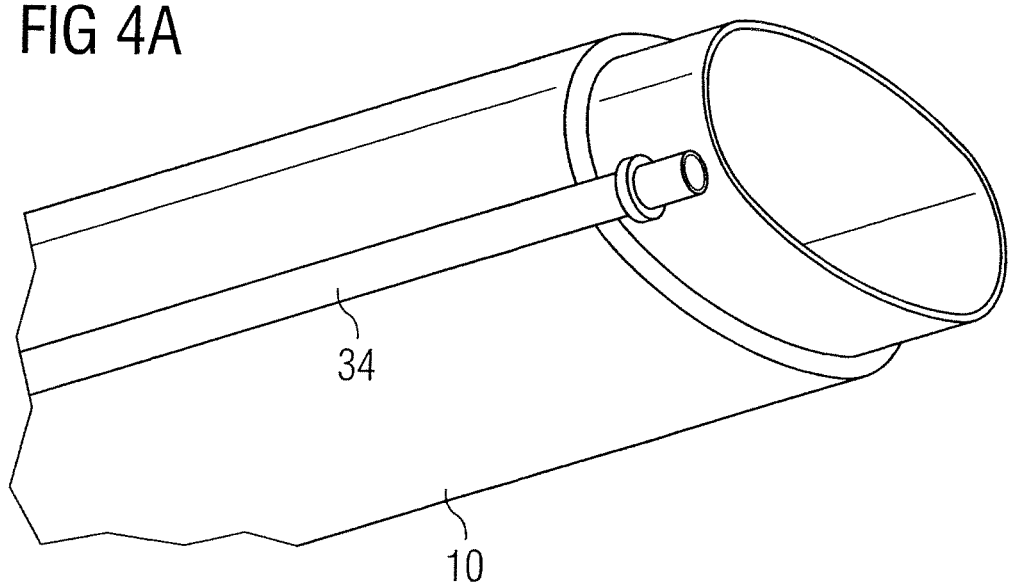

FIG. 4A shows a further embodiment of a climate tube 10, in which, in contrast to the embodiment shown in FIG. 3, an additional pipe 34 is fastened, not by means of special supports to the climate tube 10, but directly by means of an adhesive join on the exterior of the climate tube 10. In order to obtain sufficient surface area for a reliable adhesive join and at the same time reduce the dimensions of the total component, the additional pipe 34 is disposed partially embedded in the exterior of the climate tube 10, i.e. the exterior of the climate tube 10 is provided with an indentation, which receives part of the external peripheral shape of the additional pipe 34 and in which the additional pipe 34 is glued (see in particular FIG. 4B). The wall thickness of the climate tube 10 is not altered by the provision of the indentation because the layered structure 12, 14, 16 forming the wall of the climate tube 10 is pressed inwards in the region of the indentation that receives the additional pipe 34, with the result that a bulge 36 corresponding to the dimension of the indentation is formed at the inside of the climate tube 10.

Figure 4B:
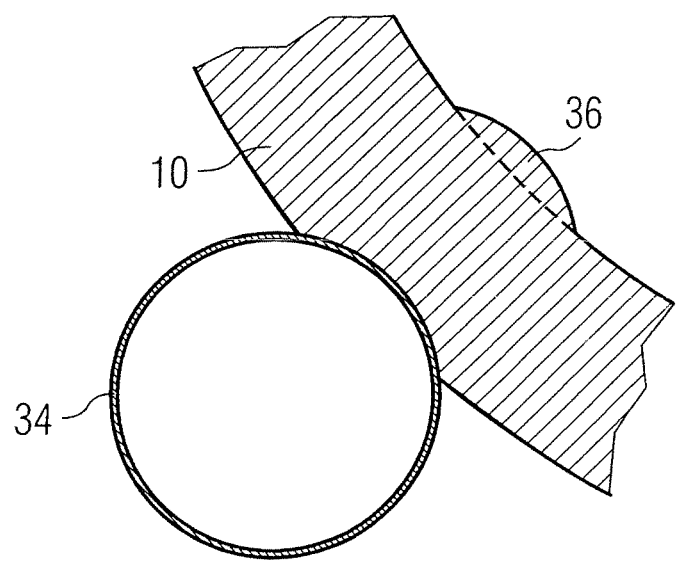

It is evident that in the embodiment shown in FIGS. 4A and 4B a very good positioning of the additional pipe 34 is also achieved, this additional pipe 34 being usable for a variety of purposes, for example to receive electric control lines or to carry a branched-off fluid stream.

FIG. 5 shows a further embodiment of a climate tube 10 having a first additional duct 38 with a small cross section and a second additional duct 40 with a larger cross section. Both additional ducts 38, 40 extend along the climate tube 10.

The first, smaller additional duct 38 is formed by a recess 42 in the honeycomb core 14 of the climate tube 10. The recess 42 may, as represented in FIG. 5, have an oval cross section, although the cross section may also be rectangular, square or some other shape. The first additional duct 38 formed by the recess 42 is therefore delimited in an inward direction by the inner layer 12 of the air-conditioning tube 10, at the sides by the honeycomb core 14 and in an outward direction by the outer layer 16 of the climate tube 10.

The second, larger additional duct 40, which in the illustrated embodiment is disposed at the opposite side of the climate tube 10, is based likewise on a, here, larger recess 44 of the honeycomb core 14, however in this region a recess is additionally formed in the outer layer 16 of the climate tube 10 and in the recess 44 there is fastened, for example by glueing, an insert part 46, the wall of which in the illustrated example is likewise made of fiber composite plastic material. The insert part 46 has a partial-pipe-shaped cross section, which is fitted by its open side into the recess 44 and fastened therein. The cross section of the second additional duct 40 thus produced is kept relatively flat to minimize the size but may alternatively have a different shape from the one illustrated. The wall of the insert part 46 may also be constructed in an identical manner to the wall of the climate tube 10, i.e. with a honeycomb core accommodated between two layers.

Both the first additional duct 38 and the second additional duct 40 are usable in many ways. Thus, for example the first additional duct 38 may accommodate control lines, while the second additional duct 40 carries a fluid stream that is separate from the fluid stream carried in the climate tube 10. These application examples and the size ratios between the individual ducts represented in FIG. 5 are merely by way of example and may easily be modified by the person skilled in the art in accordance with requirements.

Finally, FIG. 6 shows yet a further possible way of providing a climate tube 10 with a plurality of mutually separate ducts. As is evident from FIG. 6, in the embodiment shown there the free opening cross section of the climate tube 10 is subdivided in longitudinal direction by means of a first dividing wall 48 and a second dividing wall 50, which both extend in longitudinal direction of the climate tube 10. The two dividing walls 48, 50 may, as represented, have a thickness corresponding to the thickness of the wall of the climate tube 10, and they may also be constructed in an identical manner to the wall of the climate tube 10, i.e. comprise two outer layers of fiber composite plastic material, between which a honeycomb core is situated. Alternatively, it is possible to form the dividing walls 48, 50 merely by means of one wall of fiber composite plastic material. In any case, the two dividing walls 48, 50 produce in the interior of the climate tube 10 three parallel-running chambers 52, 54 and 56, the free cross section of which is determined by the position of the dividing walls 48, 50 and may be varied according to the given requirements. The intended use of the three chambers 52, 54 and 56 is freely definable, i.e. not all three chambers 52, 54 and 56 need be used to carry fluid, rather for example the chamber 56 may be used to accommodate electric lines.

The invention claimed is:

1. A climate tube used in an aircraft, the climate tube comprising:
   an inner layer of fiber composite plastic material,
   an outer layer of fiber composite plastic material, and
   an at least almost circumferential honeycomb core that is disposed between the inner layer and the outer layer and connected to the inner and the outer layer, wherein a radial thickness of the honeycomb core is a plurality of times greater than a radial thickness of each of the inner and outer layers, and
   wherein the honeycomb core has longitudinally extending edges that are mutually opposed to one another and abutting one another, each of the longitudinally extending edges being surrounded by a ply of fiber composite plastic material that are separate from the inner and outer layers.

2. A climate tube used in an aircraft, the climate tube comprising:
   an inner layer of fiber composite plastic material,
   an outer layer of fiber composite plastic material,
   an at least almost circumferential honeycomb core that is disposed between the inner layer and the outer layer and connected to the inner and the outer layer so as to define an elongate tube-like structure extending along a longitudinal axis, and wherein a radial thickness of the honeycomb core measured in a transverse direction from the longitudinal axis is a plurality of times greater than a radial thickness of each of the inner and outer layers, the honeycomb core extending from a first longitudinally extending edge to a second longitudinally extending edge that is mutually opposed to the first longitudinally extending edge and is positioned to abut the first longitudinally extending edge to close the elongate tube-like structure around the longitudinal axis, each of the first and second longitudinally extending edges oriented generally parallel to the longitudinal axis, and
   a first ply of fiber composite plastic material surrounding the first longitudinally extending edge of the honeycomb core and a second ply of fiber composite plastic material surrounding the second longitudinally extending edge of the honeycomb core such that the first and second plies abut one another when the mutually opposed first and second longitudinally extending edges are brought into abutting engagement, the first and second plies of fiber composite plastic material being separate from the inner and outer layers.

3. The climate tube according to claim 2, wherein the honeycomb core is pre-stretched in one direction.

4. The climate tube according to claim 2, wherein at least one of the inner layer and the outer layer comprises a plurality of material plies.

5. The climate tube according to claim 2, wherein the inner layer overlaps itself in the region of the abutment between the first and second longitudinally extending edges.

6. The climate tube according to claim 2, wherein an additional pipe is directly fastened by an adhesive join to an exterior surface of the climate tube.

7. The climate tube according to claim 6, wherein the additional pipe is disposed partially embedded in the exterior surface of the climate tube, wherein an opening cross section of the climate tube is reduced at the interior of the climate tube adjacent the embedding of the additional pipe.

8. The climate tube according to claim 2, wherein the climate tube supports a further climate tube.

9. The climate tube according to claim 8, wherein an insert is fastened in the honeycomb core and supports the further climate tube.

10. The climate tube according to claim 8, wherein a support is fastened on the climate tube and supports the further climate tube.

11. The climate tube according to claim 2, wherein an additional duct is formed by a recess of the honeycomb core that extends parallel to the longitudinal axis of the climate tube.

12. The climate tube according to claim 11, wherein another recess is formed in the outer layer of fiber composite plastic material and an insert part is fastened in the recess.

13. The climate tube according to claim 2, wherein a cross section of the climate tube is circular, oval or elliptical.

14. The climate tube according to claim 13, wherein the cross section of the climate tube varies over a longitudinal length of the climate tube.

15. The climate tube according to claim 2, wherein a cross section of the climate tube is subdivided in longitudinal direction by at least one dividing wall.

16. The climate tube according to claim 2, wherein the first and second plies of fiber composite plastic material surrounding the first and second longitudinally extending edges are generally U-shaped such that the inner layer overlaps both of the first and second plies of fiber composite plastic material on an interior side of the honeycomb core and such that the outer layer overlaps both of the first and second plies of fiber composite plastic material on an exterior side of the honeycomb core.

* * * * *